United States Patent [19]
van Dam et al.

[11] Patent Number: 5,872,270
[45] Date of Patent: Feb. 16, 1999

[54] FRACTIONATION OF TRIGLYCERIDE OILS

[75] Inventors: Petrus Henricus van Dam, Rotterdam; Cornelis Winkel; Adrianus Visser, both of Maassluis, all of Netherlands

[73] Assignee: Van Den Bergh Foods Company, Division of Conopco, Inc., Lisle, Ill.

[21] Appl. No.: 576,670

[22] Filed: Dec. 21, 1995

[30] Foreign Application Priority Data

Dec. 23, 1994 [EP] European Pat. Off. .............. 94203748

[51] Int. Cl.$^6$ ...................................................... C11B 7/00
[52] U.S. Cl. ............................................................ 554/211
[58] Field of Search ............................................. 554/211

[56] References Cited

U.S. PATENT DOCUMENTS

| | | |
|---|---|---|
| 2,610,915 | 9/1952 | Mattil . |
| 3,059,008 | 10/1962 | Bauer . |
| 3,059,010 | 10/1962 | Schmid et al. . |
| 3,059,011 | 10/1962 | Bauer . |
| 3,158,490 | 11/1964 | Bauer et al. . |
| 3,536,461 | 10/1970 | Mueller et al. . |
| 5,621,125 | 4/1997 | Smith . |

FOREIGN PATENT DOCUMENTS

| | | |
|---|---|---|
| 0 157 364 | 10/1985 | European Pat. Off. . |
| 1294701 | 11/1989 | Japan . |
| 1015354 | 12/1965 | United Kingdom . |
| WO 87/02679 | 5/1987 | WIPO . |
| WO 95/04122 | 2/1995 | WIPO . |

*Primary Examiner*—Paul J. Killos
*Attorney, Agent, or Firm*—Matthew Boxer

[57] ABSTRACT

Process for separating solid fatty material from a triglyceride oil, which comprises the steps a. heating the oil or a solution of the oil in an inert solvent until no longer a substantial amount of solid material is present, b. adding a crystallisation modifying substance to the oil or to the solution of the oil, c. cooling the oil resulting in crystallising a solid stearin phase besides a liquid olein phase and d. recovering the stearin phase by separating it from the olein phase, characterized in that the crystallisation modifying substance is a polysaccharide being an inulin or phlein with a molecular weight of 500–3990 Da, preferably 1300–2500 Da, of which at least 50% of the hydroxyl groups on the saccharide subunits are connected to (C8–C24) unbranched alkyl chains and the remaining hydroxyl groups, optionally, are connected with a (C1–C7)-alkyl chain, preferably in the form of an acetic ester.

9 Claims, No Drawings

FRACTIONATION OF TRIGLYCERIDE OILS

The present invention is concerned with a process for fractionating triglyceride oils.

The fractionation (fractional crystallisation) of triglyceride oils is described by Gunstone, Harwood and Padley in The Lipid Handbook, 1986 edition, pages 213–215. Generally triglyceride oils are mixtures of various triglycerides having different melting points. Triglyceride oils may be modified e.g. by separating from them by crystallisation a fraction having a different melting point or solubility.

One fractionation method is the so-called dry fractionation process which comprises cooling the oil until a solid phase crystallises and separating the crystallised phase from the liquid phase. The liquid phase is denoted as olein fraction, while the solid phase is denoted as stearin fraction.

The separation of the phases is usually carried out by filtration, optionally applying some kind of pressure.

The major problem encountered with phase separation in the dry fractionation process is the inclusion of a lot of liquid olein fraction in the separated stearin fraction. The olein fraction is thereby entrained in the inter- and intracrystal spaces of the crystal mass of the stearin fraction. Therefore the separation of the solid from the liquid fraction is only partial.

The solids content of the stearin fraction is denoted as the separation efficiency. For the dry fractionation of palm oil it seldom surpasses 50 wt .%. This is detrimental to the quality of the stearin as well as the yield of the olein.

For the related solvent fractionation process, where the fat to be fractionated is crystallised from a e.g. hexane or acetone solution, separation efficiencies may be up to 95%.

Dry fractionation is a process which is cheaper and more environmentally friendly than solvent fractionation. For dry fractionation an increase of separation efficiency is therefore much desired.

It is known to interfere with the crystallisation by adding to a crystallising oil a substance which will be generally indicated as crystallisation modifying substance. The presence of small quantities of such a substance in the cooling oil may accelerate, retard or inhibit crystallisation. In certain situations the above substances are more precisely indicated as crystal habit modifiers. Known crystallisation modifiers are e.g. sucrose fatty acid esters, described in U.S. Pat. No. 3,059,010 and fatty acid esters of glucose and derivatives, described in U.S. Pat. No. 3,059,011. These crystallisation modifiers are effective in speeding up the crystallisation rate but are not reported to increase the separation efficiency. They do not even allude to such an effect.

Other crystallisation modifiers, e.g. as described in U.S. Pat. No. 3,158,490 when added to kitchen oils have the effect that solid fat crystallisation is prevented or at least retarded. Other types of crystallisation modifiers, particularly referred to as crystal habit modifiers, are widely used as an ingredient for mineral fuel oils in which waxes are prone to crystallize at low temperatures. U.S. Pat. No. 3,536,461 teaches the addition of a crystal habit modifier to fuel oil with the effect that the cloud point (or pour point) temperature is lowered far enough to prevent crystal precipitation. Or, alternatively, the solids are induced to crystallize in a different habit so that the crystals when formed can pass fuel filters without clogging them. Other crystal habit modifiers are actually able to change the habit of the crystallized triglyceride fat crystals in a way such that after crystallization the crystals, the stearin phase, can be more effectively separated from the liquid phase, the olein phase. Not pre-published patent application WO 95/04122 deals with dry fractionation using esterified inulins and phleins as crystal habit modifiers. Publications describing such habit modifiers are e.g. GB 1 015 354 or U.S. Pat. No. 2,610,915 where such effect is accomplished by the addition of a small amounts of a polymerisation product of esters of vinyl alcohol or of a substituted vinyl alcohol. U.S. Pat. No. 3,059,008 describes the use of dextrin derivatives for the same purpose. However, these crystallisation modifying substances are still far from ideal. In the former case after three days of crystallization an increase in olein yield from 71% to only 82% was reported.

Although such improvement may seem fair, a need exists for more powerful crystallisation modifying substances which act faster and in a dry fractionation environment and which deliver still better improvements in olein yield. The selection of such habit modifiers is a problem, because it is not possible to predict which substances will succesfully comply with these requirements.

STATEMENT OF INVENTION

Polysaccharide esters have been found which are suited as crystallisation modifying substances. In contrast to many modifiers of the prior art, the present ones greatly increase the separation efficiency.

Accordingly the invention relates to a process employing such modifiers for separating solid fatty material from a triglyceride oil, which comprises the steps A. heating the oil or a solution of the oil in an inert solvent until no longer a substantial amount of solid material is present, B. adding a crystallisation modifying substance to the oil or to the solution of the oil, C. cooling the oil resulting in crystallising a solid stearin phase besides a liquid olein phase and D. recovering the stearin phase by separating it from the olein phase, characterized in that the crystallisation modifying substance is a polysaccharide being an inulin or phlein with a molecular weight of 500–3990 Da, preferably 1300–2500 Da, of which at least 50% of the hydroxyl groups on the saccharide subunits are connected to (C8–C24) unbranched alkyl chains and the remaining hydroxyl groups, optionally, are connected with a (C1–C7)-alkyl chain.

At microscopic inspection the effect of the presence of such crystallisation modifying substance is that in the oil crystals and crystal aggregates are formed which are conspicuously different from the crystals obtained without crystallisation modifying substance. These crystals and aggregates can be filtered more effectively since the stearin fraction retains less of the olein fraction even at low or moderate filtration pressure. The altered crystallisation results therefore in a considerable increase of the separation efficiency.

DETAILS OF THE INVENTION

The oil to be fractionated is mixed with the crystallisation modifying substance before crystallisation starts, preferably before the oil is heated so that all solid triglyceride fat and preferably also the modifying substance is liquified.

Then the oil is cooled to the chosen crystallisation temperature. A suitable crystallisation temperature for e.g. palm oil is 15°–35° C. By choosing a different temperature the composition of the olein and stearin phases may change. Crystallisation proceeds at the chosen temperature until a constant solid phase content is reached. The crystallisation time varies depending on the desired solid phase content. Usual times are in the range of 4–16 hours, but sometimes the crystallizing fat needs more time for reaching equilibrium. During crystallisation the oil may be stirred, e.g. with a gate stirrer. But stagnant crystallisation sometimes gives the best separation efficiency.

For the separation of the solid phase from the liquid phase generally a membrane filter press is used, because it allows rather high pressures. Suitable pressures are 3–50 bar, to be exerted for about 20–200 minutes. However, even with a low or moderate pressure the stearin phase obtained according to the present invention is easily separated from the olein phase. As a rule it takes about 30–60 minutes to have both phases properly separated.

The solids content of the crystal slurry before separation and of the separated stearin phase is measured according to the known pulse NMR method (ref. Fette, Seifen, Anstrichmittel 1978, 80, nr. 5, pp. 180–186).

The characteristic alkyl chains of crystallisation modifying substances of the present invention are preferably attached to the polysaccharide backbone via an ester bridge, e.g. by reacting a suitable fatty acid or mixture of fatty acids, optionally in the form an active derivative, with the hydroxyl groups of the polysaccharide.

A method which is particularly suitable because it may qualify as food-grade comprises the use of the methyl ester of the fatty acid(s) and the peracetate ester of the polysaccharide. Applying common process conditions such as an appropriate solvent and the presence of a usual basic substance the reaction of the reactants deliver the desired polysaccharide esters which may be recovered from the mixture.

The condition that at least 50% of the hydroxyl groups should be esterified is to be understood as the minimum esterification degree of the overall amount of hydroxyl groups and not necessarily of the hydroxyl groups of each individual subunit.

The alkyl chains attached to the polysaccharide backbone may be the same or different.

The best results have been obtained when the size of the alkyl chains attached to the saccharide subunits matches the size of the fatty acid alkyl chains of the desired stearin phase. Matching occurs when a substantial part of the chains have the same or about the same number of carbon atoms. Substantial in this respect has to be understood as being valid for 60–100% of the chains. Therefore, when palm oil is fractionated, preferred alkyl chains are cetyl (C16) and stearyl (C18) alkyl chains.

Inulin is a polyfructose comprising a terminal glucose subunit where the subunits are mutually connected via a β-1,2 glycosidic linkage. Phlein is a polyfructose comprising a terminal glucose subunit where the subunits are mutually connected via a β-2,6 glycosidic linkage. The inulin or phlein molecular weight, being 500–3990 Da, preferably 1300–2500 Da, corresponds with a chain length (denoted as $GF_n$) of the inulin or phlein being n=2–23, preferably n=7–14.

At least 50% of the hydroxyl groups have been esterified with a (C8–C24)-alkyl containing fatty acid, preferably chosen from the group comprising lauric acid, myristic acid, palmitic acid and stearic acid and the remaining hydroxyl groups have been esterified with a (C1–C7)-alkyl containing fatty acid, preferably acetic acid. The molecular weight of inulin fully esterified with three palmitic acid residues is 5.5 * the molecular weight of non-esterified inulin.

A particularly preferred group of inulin esters has been esterified for at least 50% with a mixture of lauric and palmitic acid in a ratio of 9:1 to 1:9. This crystallisation modifying substance is particularly succesful in stirred crystallisation.

The process of the invention preferably is carried out as a dry fractionation process, although the invention is useful too for solvent fractionation or detergent fractionation.

The process can be applied on triglyceride oils containing relatively high melting fat such as palm oil, palm kernel oil, shea oil, coconut oil, cottonseed oil, butter oil, hydrogenated rapeseed oil, hydrogenated soybean oil or fractions of these oils or oils obtained from the previous oils by interesterification.

The process is particularly useful for fractionating palm oil. The palm oil might be crude, but generally a refined quality is used.

The crystallisation modifying substance is suitably applied in an amount of 0.005–2 wt.%, preferably 0.01–1 wt.% on the total amount of oil.

A particular advantage of the crystallisation modifying esters of the present invention is that they are composed of polysaccharides and fatty acids, both of which are natural, physiologically acceptable substances and for which a method of preparation is available which may qualify as food-grade.

The invention comprises in particular the use as a triglyceride oil crystallisation modifying substance of all esters of inulin and phlein as defined hereinbefore.

EXAMPLE 1

Two samples were prepared each containing 1200 g of palm oil (neutralised, bleached, deodorised). The process is carried out as a common dry fractionation process, but to the first sample (A), 1.2 g (0.1 wt.%) of a crystallisation modifying substance was added. To the second sample (B), no crystallisation modifying substance was added. The crystallisation modifying substance is an inulin with an average molecular weight of about 1700 Da. It is fully esterified (DS=3) with a 1:2 mixture of lauric and palmitic acid.

Both samples were heated at 65° C. until completely liquefied (no solid fat content) and then cooled in order to crystallize. Crystallisation proceeded under stagnant conditions at the chosen temperature of 23° C. until a constant solid phase content was reached. The samples were pressed in a membrane filter for half an hour. After filtration the fractions were weighed. The olein yield is the weight of the filtrate. The stearin yield is the weight of the crystal mass (cake) remaining on the filter. The yields of the measured stearin and olein fractions are given in table 1.

TABLE 1

|  | sample A 0.1 wt. % modifier | sample B no modifier |
|---|---|---|
| temperature / °C. | 23 | 23 |
| stabilisation time / h | 188 | 16 |
| solid phase content slurry / wt. % | 15 | 12 |
| solid phase content cake / wt. % | 71 | 34 |
| olein yield / wt. % | 79 | 57 |

Before filtration, the two samples contained the same amount of solid fat. The comparison shows that the stearin fraction of the crystallisation modifying substance containing sample (A) has retained considerably less olein fraction than sample (B) without a crystallisation modifying substance. The separation efficiency showed a relative increase of 110%.

EXAMPLE 2

Example 1 was repeated while allowing the oil to crystallize under stirred conditions. The fractionation results are given in table 2.

TABLE 2

|  | sample A<br>0.1 wt. % modifier | sample B<br>no modifier |
| --- | --- | --- |
| temperature / °C. | 23 | 23 |
| stabilisation time / h | 7 | 5 |
| solid phase content slurry / wt. % | 15.5 | 13.7 |
| solid phase content cake / wt. % | 58 | 53 |
| olein yield / wt. % | 72 | 65 |

The separation efficiency showed a relative increase of 10%.

We claim:

1. Process for separating solid fatty material from a triglyceride oil, which comprises the steps
   a. heating the oil or a solution of the oil in an inert solvent until no longer a substantial amount of solid material is present,
   b. adding a crystallisation modifying substance to the oil or to the solution of the oil,
   c. cooling the oil resulting in crystallising a solid stearin phase besides a liquid olein phase and
   d. recovering the stearin phase by separating it from the olein phase, where the crystallisation modifying substance is a polysaccharide being an inulin or phlein with a molecular weight of 500–3990 Da of which at least 50% of the hydroxyl groups on the saccharide subunits are connected to (C8–C24) unbranched alkyl chains.

2. Process according to claim 1, where the polysaccharide is an inulin or phlein with a molecular weight of 1300–2500 Da.

3. Process according to claim 1, where the hydroxyl groups on the saccharide subunits which are not connected to (C8–C24) unbranched alkyl chains are connected with a (C1–C7)-alkyl chain.

4. Process according to claim 1, where the alkyl chains are connected to the polymer chain via an ester bridge.

5. Process according to claim 1, where the inulin has been esterified for at least 50% with one or more fatty acids chosen from the group comprising lauric acid, myristic acid, palmitic acid and stearic acid, while the remaining hydroxyl groups are free or have been esterified with acetic acid.

6. Process according to of claims 1, where the hydroxyl groups of the inulin have been esterified with a mixture of lauric and palmitic acid in a ratio of 9:1 to 1:9, while the remaining hydroxyl groups are free or have been esterified with acetic acid.

7. Process according to claim 1, characterised in that it is applied as a dry fractionation process.

8. Process according to claim 1, where the triglyceride oil to be fractionated is palm oil, palm kernel oil, shea oil, coconut oil, cottonseed oil, butter oil, hydrogenated rapeseed oil, hydrogenated soybean oil or fractions of these oils or oils obtained from the previous oils by interesterification.

9. Process according to claim 1, where the crystallisation modifying substance is used in an amount of 0.005–2 wt.% on the total amount of oil.

* * * * *